United States Patent
Sannino et al.

(10) Patent No.: US 6,515,831 B1
(45) Date of Patent: Feb. 4, 2003

(54) DISC HEAD SLIDER HAVING LEADING AND TRAILING CHANNELED RAILS FOR ENHANCED DAMPING

(75) Inventors: Anthony P. Sannino, Shakopee, MN (US); Jorge V. Hanchi, Minneapolis, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/548,148

(22) Filed: Apr. 13, 2000

Related U.S. Application Data

(60) Provisional application No. 60/175,569, filed on Jan. 11, 2000.

(51) Int. Cl.⁷ .............................................. G11B 21/21
(52) U.S. Cl. ................. 360/235.6; 360/235.8; 360/236; 360/236.1; 360/236.2; 360/236.3
(58) Field of Search ........................... 360/235.4, 235.8, 360/236.1, 236.6, 236.8, 236.9, 237

(56) References Cited

U.S. PATENT DOCUMENTS

| 4,212,044 A | 7/1980 | Plotto |
| 4,218,715 A | 8/1980 | Garnier |
| 4,553,184 A | 11/1985 | Ogishima |
| 4,646,180 A | 2/1987 | Ohtsubo |
| 4,984,114 A | 1/1991 | Takeuchi et al. |
| 5,086,360 A | 2/1992 | Smith et al. |
| 5,128,822 A | 7/1992 | Chapin et al. |
| 5,200,868 A | 4/1993 | Chapin et al. |
| 5,218,494 A | 6/1993 | Chapin et al. |
| 5,317,465 A | 5/1994 | Chapin et al. |
| 5,343,343 A | 8/1994 | Chapin |
| 5,359,480 A | 10/1994 | Nepela et al. |
| 5,490,026 A | 2/1996 | Dorius et al. |
| 5,513,056 A | 4/1996 | Kawasaki et al. |
| 5,550,693 A | 8/1996 | Hendriks et al. |
| 5,636,085 A | 6/1997 | Jones et al. |
| 5,737,151 A | 4/1998 | Bolasna et al. |
| 5,761,004 A | 6/1998 | Peck |
| 5,796,551 A | 8/1998 | Samuelson |
| 5,953,181 A | 9/1999 | Utsunomiya |
| 5,963,396 A | 10/1999 | Burga et al. |
| 5,973,881 A | 10/1999 | Ajiki |
| 6,021,020 A | * 2/2000 | Itoh et al. |
| 6,188,547 B1 | * 2/2001 | Gui et al. ................. 360/236.5 |

FOREIGN PATENT DOCUMENTS

| JP | 60-242548 | 12/1985 |
| JP | 1-211383 | 8/1989 |
| JP | 1-245480 | 9/1989 |
| JP | 1-319188 | 12/1989 |
| JP | 3-132981 | 6/1991 |

\* cited by examiner

*Primary Examiner*—Craig A. Renner
(74) *Attorney, Agent, or Firm*—Westman, Champlin & Kelly

(57) ABSTRACT

A disc head slider includes a leading slider edge, a cavity dam, a subambient pressure cavity, which trails the cavity dam and has a cavity floor, and first and second rails disposed about the subambient pressure cavity. Each rail has leading and trailing bearing surfaces and a recessed surface extending between the leading and trailing bearing surfaces, which is recessed from the bearing surfaces and raised from the cavity floor, across the rail width. Recessed leading channels are positioned near the leading slider edge and have a leading channel end open to fluid flow from the leading slider edge, non-divergent channel side walls, and a trailing channel end closed to the fluid flow. A trailing channel is recessed within each of the trailing bearing surfaces and has a leading channel end open to fluid flow from the respective recessed surface, non-divergent channel side walls, and a trailing channel end closed to the fluid flow.

19 Claims, 17 Drawing Sheets

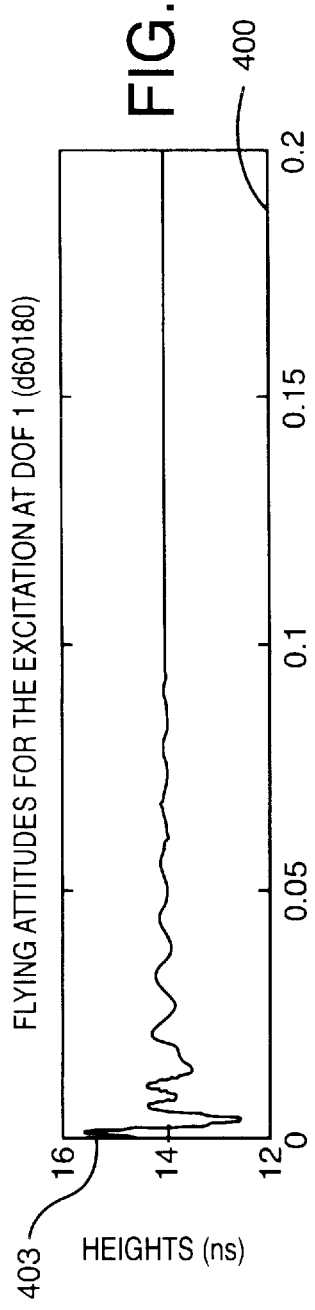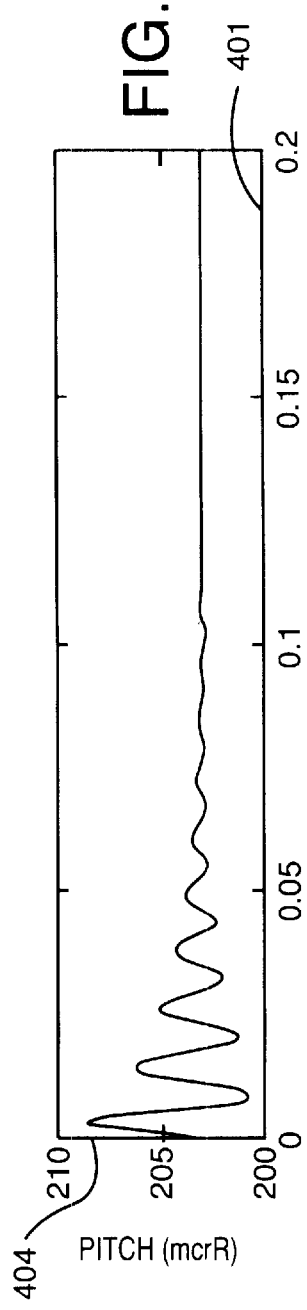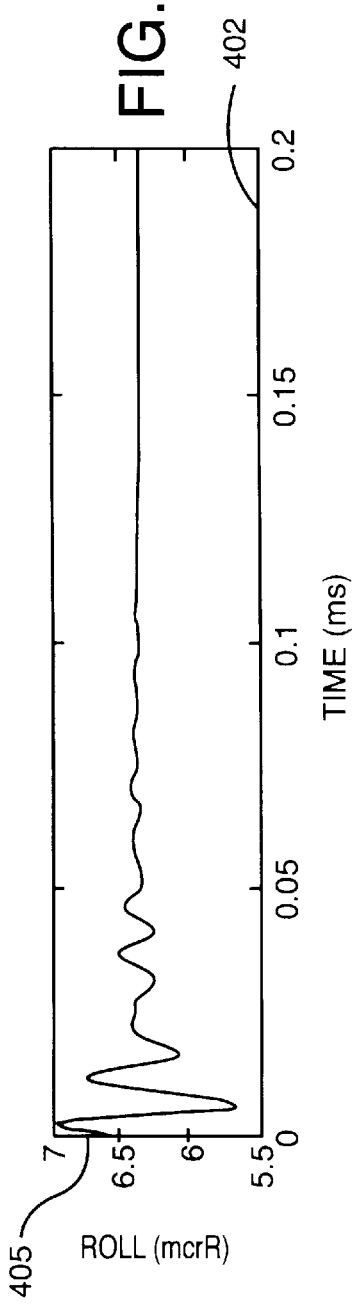

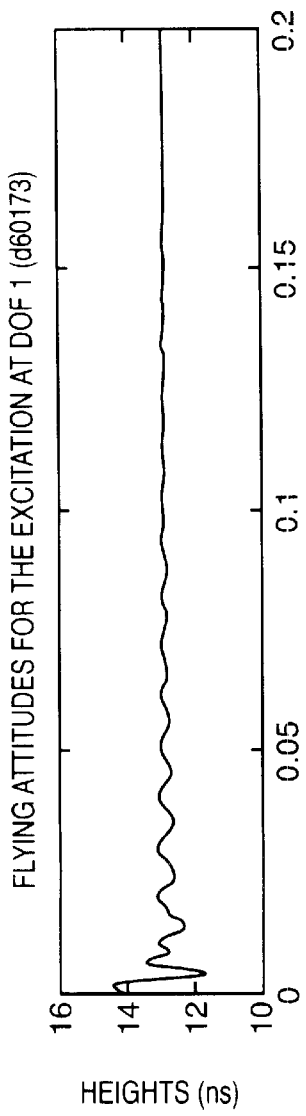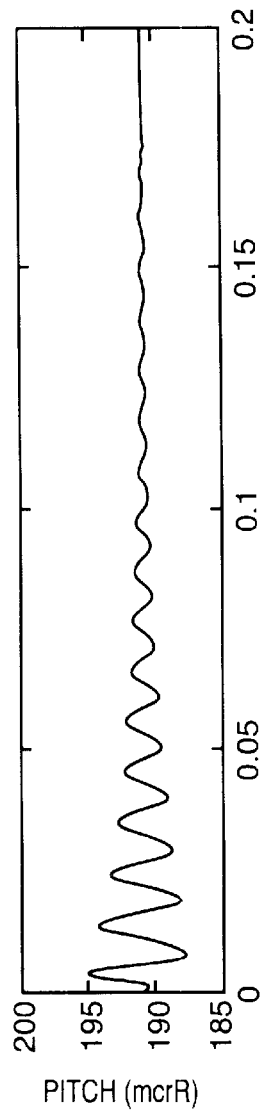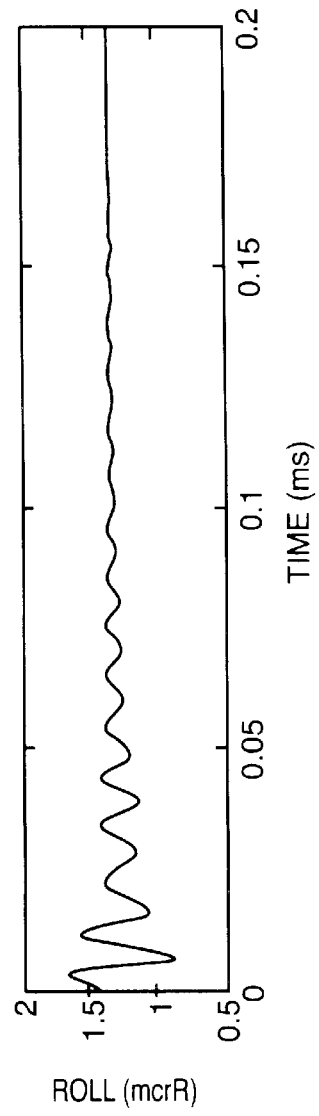

DISC HEAD SLIDER HAVING LEADING AND TRAILING CHANNELED RAILS FOR ENHANCED DAMPING

CROSS-REFERENCE TO RELATED APPLICATION

This application claims the benefit of U.S. Provisional Application Ser. No. 60/175,569, entitled "SIDE RAIL, LEADING AND TRAILING EDGE TRENCH AAB FOR ENHANCED DAMPING," filed Jan. 11, 2000.

Cross reference is also made to U.S. Ser. No. 09/398,993, entitled "CONVERGENT CHANNEL, TRENCHED DISC HEAD SLIDER," filed Sep. 17, 1999, and to U.S. Ser. No. 09/549,424, entitled "DISC HEAD SLIDER HAVING RECESSED, TRENCHED RAILS FOR REDUCED STICTION," filed on even date herewith.

BACKGROUND OF THE INVENTION

The present invention relates to disc drive data storage systems and, more particularly, to a disc drive data storage system having a slider, which reduces stiction with the disc surface while providing sufficient bearing stiffness.

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised side rails, a cavity dam and a subambient pressure cavity. The leading taper is typically lapped or etched onto the end of the slider that is opposite to the recording head. The leading taper pressurizes the air as the air is dragged under the slider by the disc surface. An additional effect of the leading taper is that the pressure distribution under the slider has a first peak near the taper end or "leading edge" due to a high compression angle of the taper or step, and a second peak near the recording end or "trailing edge" due to a low bearing clearance for efficient magnetic recording. This dual-peak pressure distribution results in a bearing with a high pitch stiffness.

The bearing clearance between the slider and the disc surface at the recording head is an important parameter to disc drive performance. Slider bearings in computer hard drives have three degrees of freedom, including vertical motion, pitch rotation and roll rotation. The three degrees of freedom are associated with three vibration modes. As in any mechanical system, these three vibration modes have respective natural, or "resonant", frequencies, which depend on the mass and stiffness of the respective degree of freedom. When a slider is subjected to an external vibration source having a frequency that resides in the vicinity of one or more of the bearing's natural frequencies, the slider sustains vibrations, which often result in significant modulation of the head-media spacing. Modulation of the head-media spacing degrades the head's read and write performance and can cause intermittent contact between the head and the disc surface.

As bearing clearances continue to decrease to achieve greater recording densities, micro-waviness in the disc surface has been observed to be an increasing source of vibration excitation for sliders, especially at flying heights below 0.5 microinches. Since micro-waviness is a broadband frequency type of excitation, it is often impossible to de-couple the bearing's natural frequency with the frequency of the excitation source by changes to the design of the bearing surface.

A slider is desired, which dampens head-media separation modulation in response to dynamic excitation induced by media micro-waviness at flying heights below 0.5 microinches.

SUMMARY OF THE INVENTION

One aspect of the present invention relates to a disc head slider, which includes a leading slider edge, a cavity dam, a subambient pressure cavity, which trails the cavity dam and has a cavity floor, and first and second rails disposed about the subambient pressure cavity. Each rail has a rail width, which is measured from an inner rail edge to an outer rail edge, a leading bearing surface, a trailing bearing surface, and a recessed surface extending between the leading and trailing bearing surfaces. The recessed surface is recessed from the bearing surfaces and raised from the cavity floor, across the rail width. First and second recessed leading channels are positioned near the leading slider edge. each leading channel has a leading channel end open to fluid flow from the leading slider edge, non-divergent channel side walls, and a trailing channel end closed to the fluid flow from the leading slider edge. A trailing channel is recessed within each of the trailing bearing surfaces. Each trailing channel has a leading channel end open to fluid flow from the respective recessed surface, non-divergent channel side walls, and a trailing channel end closed to the fluid flow from the respective recessed surface.

Another aspect of the present invention relates to a disc head slider, which includes a leading slider edge, a trailing slider edge, first and second laterally spaced leading bearing surfaces, and first and second laterally spaced trailing bearing surfaces positioned between the first and second leading bearing surfaces and the trailing slider edge. A convergent channel is recessed within each of the leading and trailing bearing surfaces. Each channel has a leading channel end open to fluid flow from the leading slider edge, non-divergent channel side walls, a trailing channel end closed to the fluid flow, a channel width and a channel length. The trailing channel end is positioned forward of a localized pressure gradient region on the respective bearing surface, downstream of the channel. The channel width is measured between the channel side walls, and the channel length is measured between the leading and trailing channel ends and is at least twice the channel width. The localized pressure gradient region has a length, which is at least as long as the channel width.

Yet another aspect of the present invention relates to a disc drive assembly, which includes a disc and a slider bearing. The disc is rotatable about a central axis and has a recording surface with a circumferential waviness characteristic. The slider bearing supports a transducer over the recording surface at a flying height of 0.5 microinches or less during rotation of the disc and generates vibration dampening pressure gradients of at least 20 Giga-Pascals per meter between the bearing surface and the disc, at multiple locations along the bearing surface.

BRIEF DESCRIPTION OF THE DRAWINGS

FIGS. 7A, 7B and 7C are graphs showing simulated flying height, pitch and roll impulse vibration responses of the slider shown in FIG. 5.

FIGS. 15A, 15B and 15C are graphs showing simulated flying height, pitch and roll impulse vibration responses of the slider shown in FIG. 14.

DETAILED DESCRIPTION OF THE PREFERRED EMBODIMENTS

Figure 1:
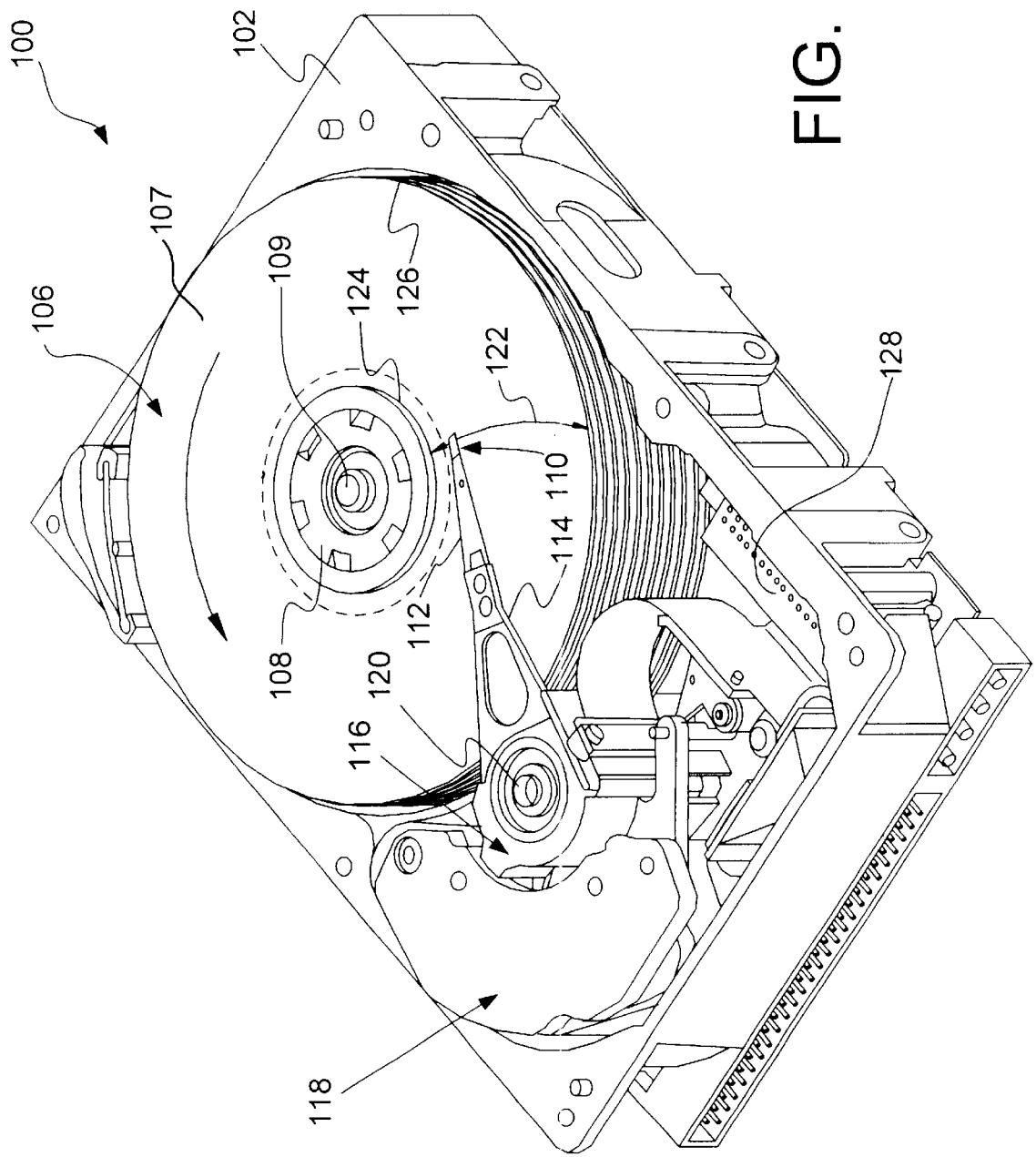
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air under the respective sliders 110 and along their bearing surfaces in a direction approximately parallel to the tangential velocity of the discs. As the air passes beneath the bearing surfaces, air compression along the air flow path causes the air pressure between the discs and the bearing surfaces to increase, which creates a hydrodynamic lifting force that counteracts the load force provided by suspensions 112 and causes the sliders 110 to lift and fly above or in close proximity to the disc surfaces.

Figure 2:
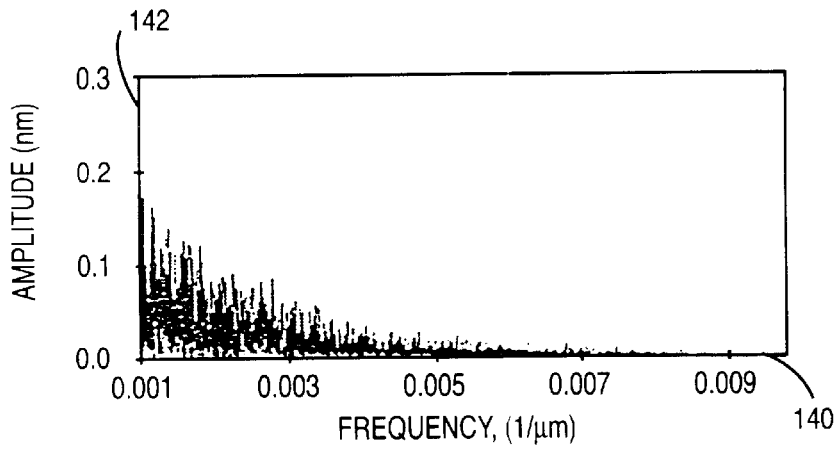
FIG. 2 is a graph showing a typical amplitude spectrum of media micro-waviness in a rigid magnetic disc surface.
Figure 3:
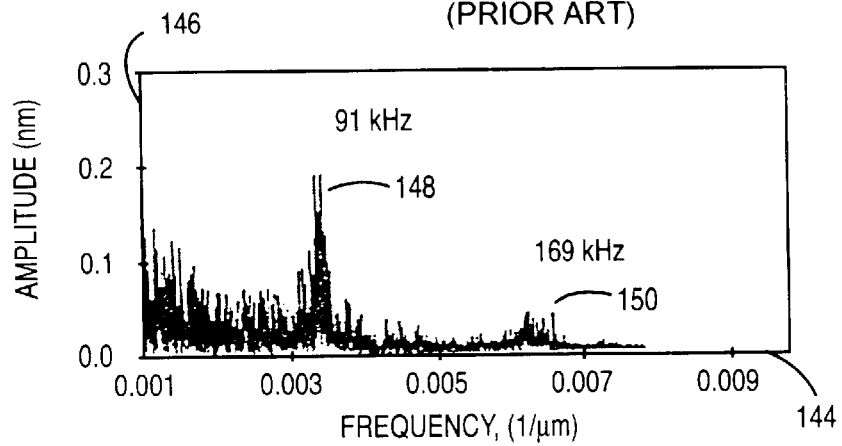
FIG. 3 is a graph showing head vibration response of a 30-series typical NPAB slider, as shown in FIG. 8.

Although each of the discs 107 in drive 100 are fabricated as flat as possible, the discs 107 have some amount of circumferential micro-waviness. FIG. 2 is a graph showing a typical amplitude spectrum of media micro-waviness in a rigid magnetic disc surface. Axis 140 represents frequency, (1/micrometer), and axis 142 represents amplitude in nanometers (nm). A computer-based simulation was per-formed on a model of a conventional 30-series negative pressure air bearing slider (shown in FIG. 8) to obtain a measurement of vibrations induced in the slider in response to the disc micro-waviness shown in FIG. 2. FIG. 3 is a graph showing the measured head vibration response. Axis 144 represents frequency (1/um), and axis 146 represents amplitude (nm) of the vibration induced in the slider. As can be seen in FIG. 3, the conventional slider has two visible resonance frequencies at 91 kHz and 169 kHz, at peaks 148 and 150. The disc micro-waviness therefore excites the natural vibration frequencies of the conventional 30-series slider.

Figure 4:
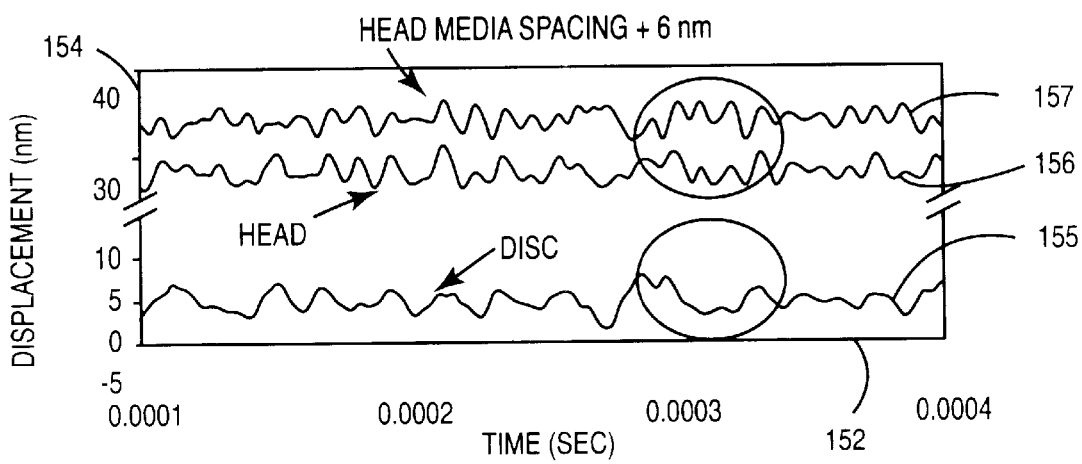
FIG. 4 is a graph illustrating measured head and disc displacement over time with the disc micro-waviness shown in FIG. 2 and the head vibration response shown in FIG. 3.

FIG. 4 is a graph illustrating measured head and disc displacement over time for the conventional 30-series slider given the disc micro-waviness shown in FIG. 2 and the head vibration response shown in FIG. 3. Axis 152 represents time in seconds, and axis 154 represents displacement in nm. Line 155 represents the vertical displacement of the disc surface over time. Line 156 represents the vertical displacement of the conventional 30-series slider at the head location induced by the disc micro-waviness over time. Since displacement of the head and disc are out of phase with one another, this results in modulation of the head-media separation (plus 6 nm), as shown by line 157. In this particular case, a modulation of 6 nm was observed for a nominal flying height of 30 nm, which corresponds to a 20% modulation in flying height.

Further experimental data showed that such fluctuation in flying height can be detrimental to mechanical and magnetic performance of the head-disc interface at lower flying heights, and particularly at flying heights below 12 nm or 0.5 uin. Specifically, this flying height fluctuation can cause intermittent contact between the head and disc surface and can cause degradation of the head's read/write performance.

As discussed in more detail below, each slider 110 (shown in FIG. 1) has a hydrodynamic (e.g., air) bearing that provides decreased head-media separation (HMS) modulation in response to dynamic excitation induced by media micro-waviness, other media defects or patterned media, at flying heights at or below 0.5 microinches.

Figure 5:
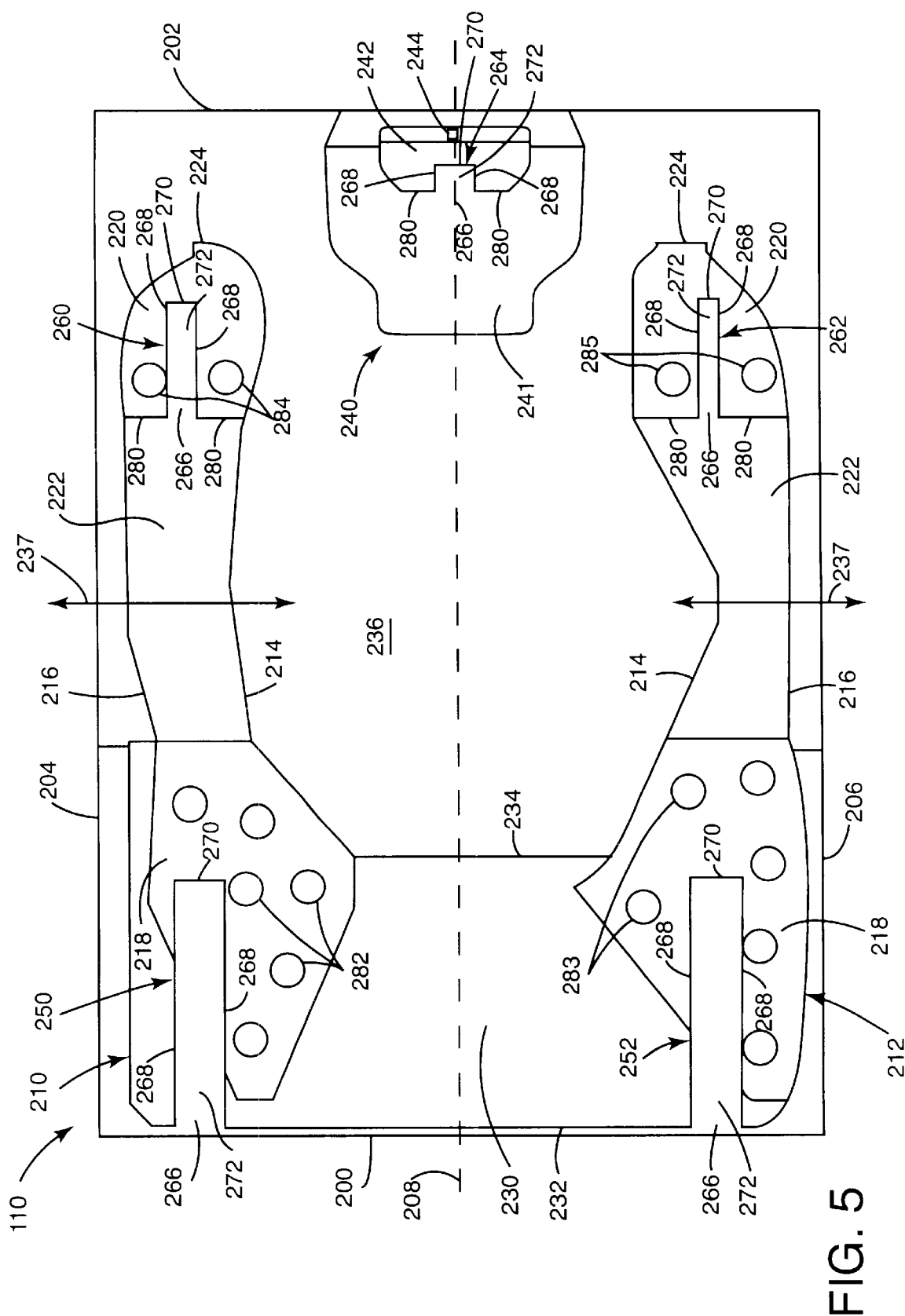
FIG. 5 is a bottom plan view of a slider shown in FIG. 1, as viewed from the surface of a disc, according to one embodiment of the present invention.

FIG. 5 is a bottom plan view of one of the sliders 110 of FIG. 1, as viewed from the surface of disc 107. Slider 110 has a leading edge 200, a trailing edge 202, side edges 204 and 206, and a lateral center line 208. Elongated, raised side rails 210 and 212 are positioned along side edges 204 and 206, respectively. Rails 210 and 212 extend generally from leading slider edge 200 toward trailing slider edge 202 and terminate prior to trailing edge 202. Each rail 210 and 212 has an inside rail edge 214, an outside rail edge 216, a leading bearing surface 218, a trailing bearing surface 220 and a recessed waist surface 222. Recessed waist surface 222 extends from leading bearing surface 218 to trailing bearing surface 220. In one embodiment, waist surfaces 222 are generally parallel to and recessed from bearing surfaces 218 and 220 by a step depth of 0.1 to 0.3 um, for example, such that the waist surfaces reduce the contact area of slider 110 when at rest on the surface of disc 107. The recessed waist surfaces develop substantially ambient pressure during flight. Other depths can also be used in alternative embodiments.

A cavity dam 230 extends between rails 210 and 212, along leading slider edge 200. Cavity dam 230 has a leading edge 232 and a trailing edge 234. Cavity dam 230 and inside edges 214 of side rails 210 and 212 define a subambient pressure cavity 236, which trails cavity dam 230 relative to a direction of air flow from the leading slider edge 200 toward trailing slider edge 202. In one embodiment, subambient pressure cavity 236 is recessed from leading and trailing bearing surfaces 218 and 220 by 1 to 3 um. Although recessed waist surfaces 222 are recessed from bearing surfaces 218 and 220, waist surfaces 222 remain raised from the floor of cavity 236 such that the waist surfaces 222 continue to define the shape of the cavity 236 and contain subambient pressure within cavity 236. Recessed waist surfaces 222 provide a lateral channel between subambient pressure cavity 236 and ambient pressure at slider side edges 204 and 206, thereby allowing transverse viscous shear flow, represented by arrows 237. This transverse viscous shear flow along arrows 237 provides an energy dissipation mechanism, which dampens vibrations in slider 110 that are induced by disc media micro-waviness. This, in turn, reduces modulation of the head-media separation.

In one embodiment, cavity dam 230 is generally parallel to and recessed from bearing surfaces 218 and 220 by a step depth of 0.1 to 0.3 um, for example. Other depths can also be used. In addition, cavity dam 230 can be formed with a tapered leading edge in alternative embodiments, if desired.

A raised center pad or rail 240 is positioned along trailing slider edge 202 and is centered along lateral center line 208. In alternative embodiments, center pad 240 can be skewed or offset with respect to line 208. Center pad 240 has a leading step surface 241 and a bearing surface 242. Leading step surface 241 is generally parallel to and recessed from bearing surface 242 by a step depth of 0.1 to 0.3 um, for example, for providing pressurization of bearing surface 242 from air flow venting from cavity 236. Center rail 240 supports a read/write transducer 244 along trailing slider edge 202. In alternative embodiments, transducer 244 can be positioned at other locations on slider 110. However, when placed at or near trailing slider edge 202, transducer 244 is located at the closest point on slider 110 to the surface of disc 107 (shown in FIG. 1) when slider 110 flies with a positive pitch angle. With a positive pitch angle, trailing slider edge 202 is closer to the surface of disc 107 than leading slider edge 200.

Rails 210 and 212 terminate prior to trailing slider edge 202 to allow slider 110 to roll about lateral center line 208 without risking contact between trailing rail edges 224 and the disc surface. Therefore, trailing edge of center pad 240 remains the closest location on slider 110 to the disc surface during flight at relatively large roll angles, thereby improving read and write performance. However, truncating side rails 210 and 212 reduces the amount of positive pressure developed along the rails near trailing slider edge 202, which reduces pitch and roll stiffness.

In order to limit the reduction in pitch and roll stiffness and to further limit head-media separation modulation, slider 110 includes leading convergent channel features 250 and 252, which are recessed within leading bearing surfaces 218 and trailing convergent channel features 260, 262 and 264, which are recessed within trailing bearing surfaces 220 and within center rail bearing surface 242. These channels can also be referred to as trenches. Channels 250, 252, 260, 262 and 264 each have a leading channel end 266, non-divergent side walls 268, a trailing channel end 270 and a channel floor (or "step surface") 272. Channels 260, 262 and 264 also have a side wall 280 to either side of the leading channel ends 266. Channels 250, 252, 260, 262 and 264 are formed through photolithography processes such as ion milling, chemical etching or reactive ion etching (RIE). With these processes, the depth and location of the channels can be accurately controlled.

In one embodiment, channel floors 272 of trailing channels 260 and 262 are coplanar and contiguous with recessed waist surfaces 222 of rails 210 and 212, while channel floor 272 of channel 264 is coplanar and contiguous with leading step surface 241 of center rail 240. Trailing channels 260, 262 and 264 thus have depths, as measured from bearing surfaces 218 and 220, of 0.1 to 0.3 micrometers, for example. In one embodiment, leading channels 250 and 252 are milled or etched during the formation of the step surfaces 222, 230 and 241 and the cavity 236 such that leading channels 250 and 252 have a depth of 1.1 to 3.3 micrometers, as measured from bearing surfaces 218 and 220, which is greater than the depth of cavity 236 and of trailing channels 260, 262 and 264.

In leading channels 250 and 252, leading channel end 266 is open to fluid flow from slider leading edge 200. However, trailing channel end 270 is closed to the fluid flow. A portion of the fluid flow from slider leading edge 200 is directed into channels 250 and 252 and is forced to exit the channels over trailing channels ends 270. This creates localized positive pressure gradient regions on leading bearing surfaces 218 rearward of trailing channel ends 270. In one embodiment, leading bearing surfaces 218 have a length measured from trailing channel ends 270 to recessed waist surfaces 222 that is at least as great as the width of channels 250 and 252, as measured between side walls 268. This provides enough of a bearing surface on which the localized positive pressure gradient can act. The localized positive pressure gradients developed on leading bearing surfaces 218 yield high peak pressures along the bearing surfaces, which increase the pitch stiffness of slider 110. The high pressure gradients also provide an energy dissipation mechanism during slider vibration, which dampens leading edge pitch mode type vibrations at the slider's natural resonance frequencies.

Similarly, in trailing channels 260 and 262, leading channel end 266 is open to fluid flow from recessed surfaces 222 of the side rails 210 and 212, respectively. Trailing channel end 270 is closed to the fluid flow. A portion of the fluid flow from recessed surfaces 222 is directed into channels 260 and 262 and is forced to exit the channels over trailing channels ends 270. This creates localized positive pressure gradient regions on trailing bearing surfaces 220 rearward of trailing channel ends 270. In one embodiment, trailing bearing surfaces 220 have a length measured from trailing channel ends 270 to trailing rail edges 224 that is equal to or greater than the width of channels 260 and 262, as measured between side walls 268. The localized positive pressure developed on trailing bearing surfaces 220 increases the roll stiffness of slider 110 and yields high peak pressures and pressure gradients, which dampens roll mode type vibrations at the slider's natural resonance frequencies.

With respect to channel 264 on center rail 240, the leading end 266 of this channel is open to fluid flow from cavity 236, and trailing channel end 270 is closed to the fluid flow. A portion of the fluid flow from cavity 236 is directed into channel 264 and is forced to exit the channel over trailing channel end 270. Again, this creates a localized positive pressure gradient region on bearing surface 242, rearward of trailing channel end 270. In one embodiment, center rail bearing surface 242 has a length between trailing channel end 270 and trailing slider edge 202 that is at least the width of channel 264, as measured between side walls 268. The localized positive pressure developed on center rail bearing surface 242 increases the pitch stiffness of slider 110 and dampens trailing edge pitch mode type vibrations at the slider's natural resonance frequencies.

During operation, the side walls to either side of leading channel ends 266 present themselves as a substantial pressure rise to the local fluid flow. Since the opening to each channel, at leading channel ends 266, does not have the same pressure rise, it is seen as a preferential path for the fluid flow to travel. Once the fluid flow enters channels 250, 252, 260, 262 and 264, the flow is essentially bounded by channel side walls 268 and trailing channel end 270 and is forced to rise over trailing channel end 270, forming a "convergent" channel for the flow. This creates the localized pressure areas at discrete regions on the bearing surfaces. Channels 250, 252, 260, 262 and 264 can be symmetrical about lateral center line 208, as shown in FIG. 2, or can be asymmetrical to provide preferential pressurization at certain slider skew angles.

The size and intensity of the localized positive pressure gradient regions depend on the channel length to width ratio, the absolute sizes of the channels, the depth and shape of the channel floors, and the height of the column of air between the channel floor and the disc surface. In one embodiment, the ratio of the channel lengths to the channel widths range from 0.5 to 5.0, but may vary outside that range depending the design purposes of the channel feature. In another embodiment, the length to width ratio ranges from 2.0 to 2.5. Since slider 110 flies with a positive pitch, the column of air beneath leading channels 250 and 252 is longer than the column of air beneath trailing channels 260, 262 and 264. Therefore, leading channels 250 and 252 are formed deeper than trailing channels 260, 262 and 264, as described above, to achieve sufficient pressure gradients along leading bearing surfaces 218.

The pressure profile across the bearing surfaces of slider 110 was compared with the pressure profile across the bearing surfaces of a similar slider without channels 250, 252, 260, 262 and 264 under similar operating conditions. The maximum pressure gradient achieved with the slider having no channels on center rail 240 was $4.1 \times 10^9$ Pascals/meter. The maximum pressure gradient achieved with center rail channel 264 on slider 110 was $73 \times 10^9$ Pascals/meter. The maximum pressure gradient achieved with trailing side rail channels 260 and 262 on slider 110 was $20 \times 10^9$ Pascals/meter.

Slider 110 can further include raised pads or "bumps" 282–285, which extend slightly from bearing surfaces 218 and 220 by about 10 nanometers (nm) to about 30 nm. Pads 282–285 provide a slight separation between bearing surfaces 218 and 220 and the disc surface when slider 110 is at rest for reducing stiction forces between the slider and the disc surface. Pads 282–285 can have a variety of cross-sectional shapes, such as circular, rectangular or elongated ovals. Other shapes can also be used.

Figure 6:
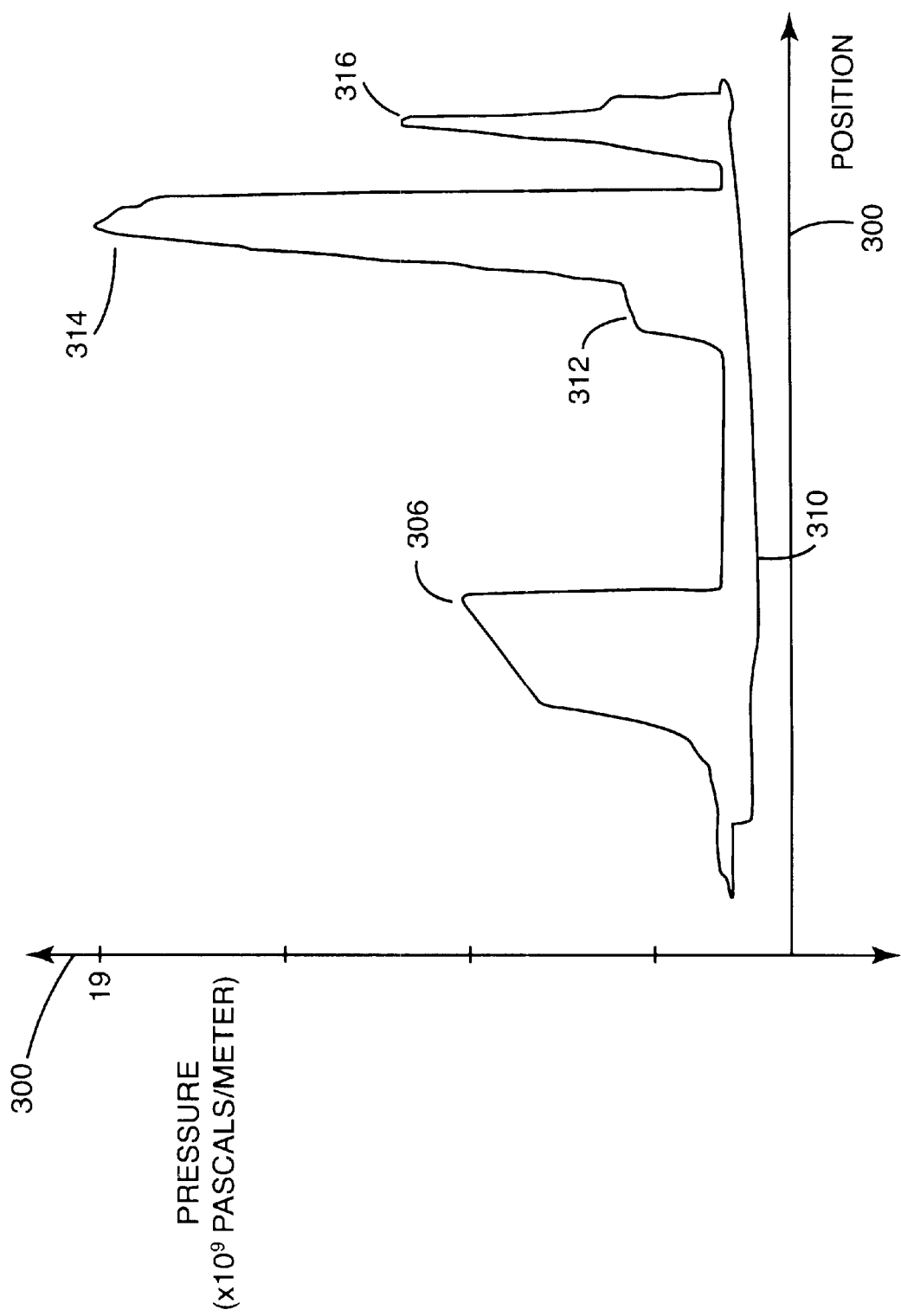
FIG. 6 is a three dimensional diagram illustrating a pressure profile across the bearing surfaces of the slider shown in FIG. 5.

FIG. 6 is a diagram illustrating a side view of the pressure profile across the bearing surfaces of slider 110, as viewed from side edge 206, according to one embodiment of the present invention. Axis 300 represents position along side edge 206, as measured from leading edge 200 to trailing edge 202. Axis 302 represents pressure amplitude in gigapascals/meter. Leading channels 250 and 252 each generate a high peak pressure 306 on leading bearing surfaces 218 of side rails 210 and 212, with a high pressure gradient just aft of slider leading edge 200. Subambient pressure cavity 236 generates subambient pressure in area 310. Trailing bearing surfaces 220 of side rails 210 and 212 generate moderate positive pressure in area 312 due to the recess of waist surfaces 222. However, channels 260 and 262 generate a high localized pressure peak 314, which compensates for the pressure loss over waist surfaces 222 and provides high roll stiffness and vibration damping. Likewise, channel 264 in center rail 240 generates a high localized pressure peak 316 near trailing slider edge 202, which provides high pitch stiffness and vibration damping.

Recessed waist surfaces 222 (shown in FIG. 2) therefore have two primary functions. First, recessed waist surfaces 222 allow pressurization of channels 260 and 262 for producing the high peak pressures 316 and 318 and pressure gradients shown in FIG. 4. Second, recessed waist surfaces 222 allow transverse viscous shear flow between subambient pressure cavity 236 and the side edges of the slider, which provides an additional energy dissipation mechanism during vibration.

The vibration response of slider 110 was compared to the vibration responses of similarly shaped sliders in which the application of convergent channel features was varied from one slider to the next. The various sliders were evaluated using a modeling technique similar to that described in Q. H. Zeng, "Stiffness and Damping Evaluation of Air Bearing Sliders and New Designs with High Damping", Journal of Tribology, April 1999, Vol. Pp. 341–347. FIGS. 7A, 7B and 7C are graphs showing the simulated flying height, pitch and roll impulse vibration responses, respectively, of slider 110 from an impulse vibration input occurring at time zero. The X-axes in FIGS. 7A–7C represent time in milliseconds (ms). The Y-axis in FIG. 7A represents flying height in nanometers (nm). The Y-axis in FIG. 7B represents pitch in microradians. The Y-axis in FIG. 7C represents roll in microradians. As can be seen in FIGS. 7A–7C, slider 110 quickly dampens flying height, pitch and roll type vibrations.

Figure 7D:
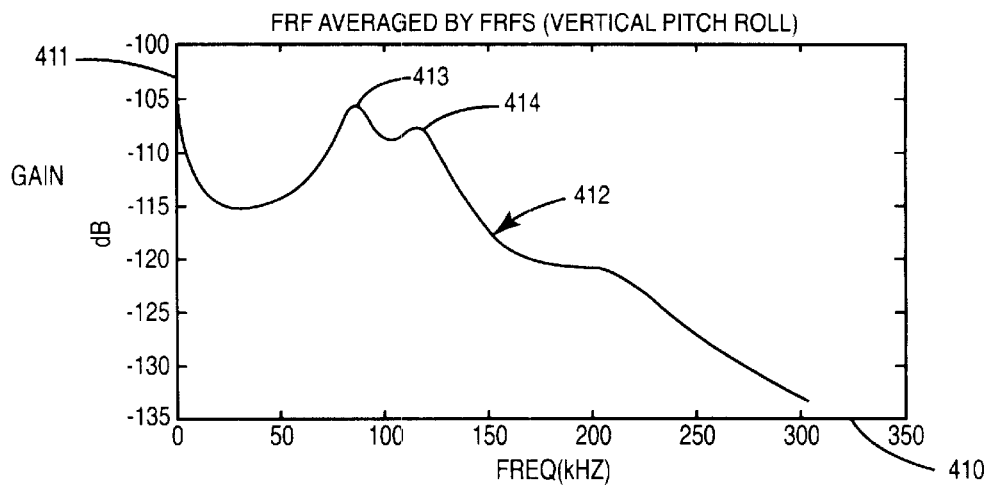
FIG. 7D is a graph illustrating vibration frequency response of the slider shown in FIG. 5.

FIG. 7D is a graph illustrating the frequency response of slider 110. X-axis 410 represents frequency in kilohertz, and Y-axis 411 represents gain in dB. Line 411 represents the average of the frequency responses for the flying height, pitch and roll of slider 110. Slider 110 has dampened gain at the natural resonant frequencies represents by peaks 413, 414 and 415 for the three vibration modes shown in FIGS. 7A–7C.

Figure 7E:
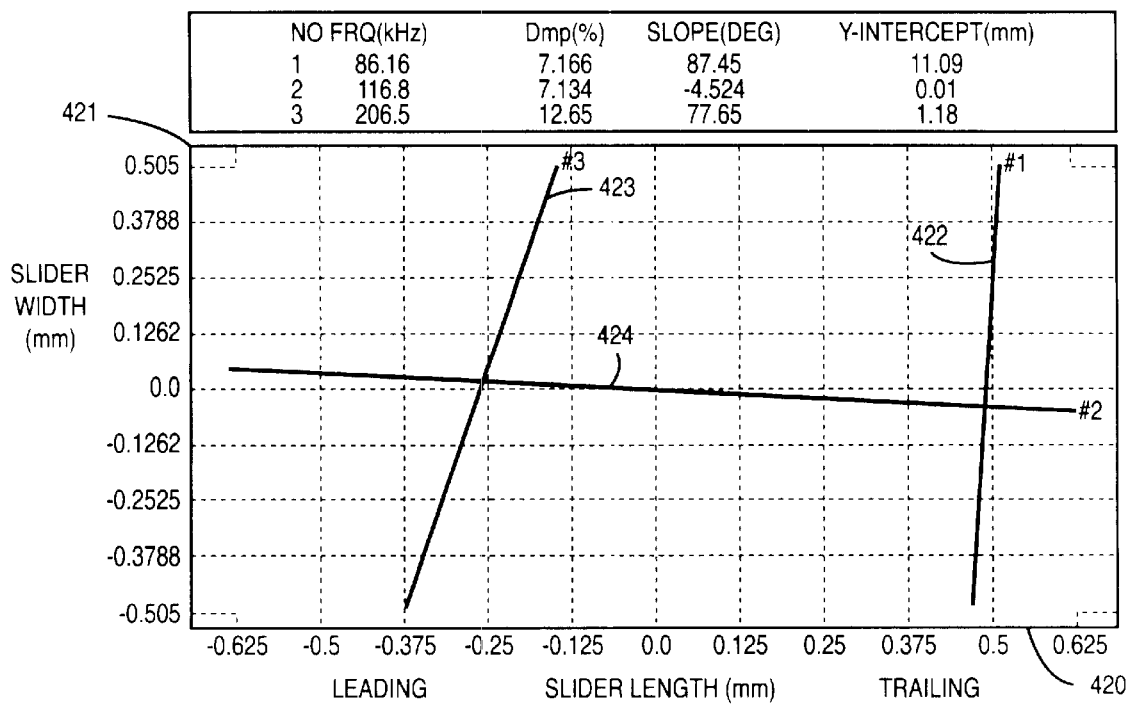
FIG. 7E is a graph illustrating vibration nodal lines (or axes of rotational vibration) of the slider shown in FIG. 5 as a function of position on the slider surface.

FIG. 7E is a graph illustrating the various vibration nodal lines (or axes of rotational vibration) of slider 110 as a function of position on the slider surface. Axis 420 represents position in millimeters (mm) along the slider length, with position "0" representing the geometric midpoint. Axis 421 represents position in millimeters along the slider width, with position "0" representing the geometric midpoint. Lines 422, 423 and 424 represent the vibration nodal lines for trailing edge pitch mode, leading edge pitch mode and roll mode type vibrations, respectively.

FIGS. 7A–7E show that slider 110 has high 7.2%, 7.1% and 12.6% damping ratios for leading edge pitch mode, roll mode and trailing edge pitch mode type vibrations, respectively.

Figure 8:
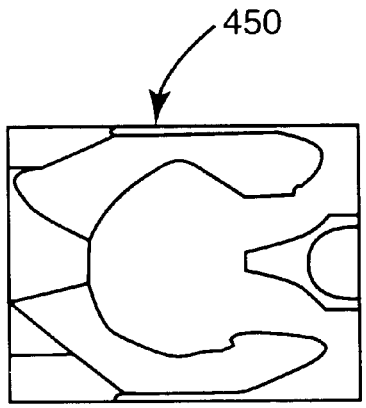
FIG. 8 is a bottom, perspective view of a slider, which does not have convergent channel features or recessed waist surfaces.
Figures 9A, 9B, 9C:
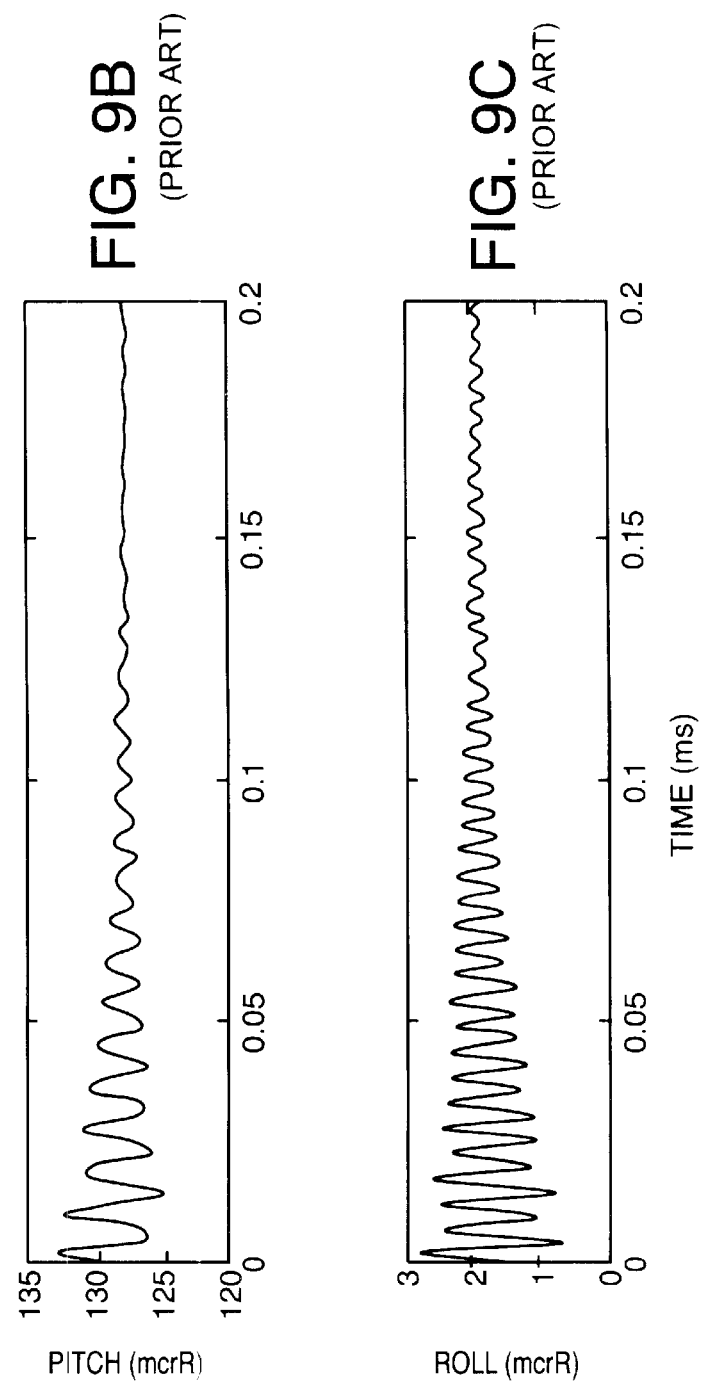
FIGS. 9A, 9B and 9C are graphs showing simulated flying height, pitch and roll impulse vibration responses of the slider shown in FIG. 8.
Figure 9D:
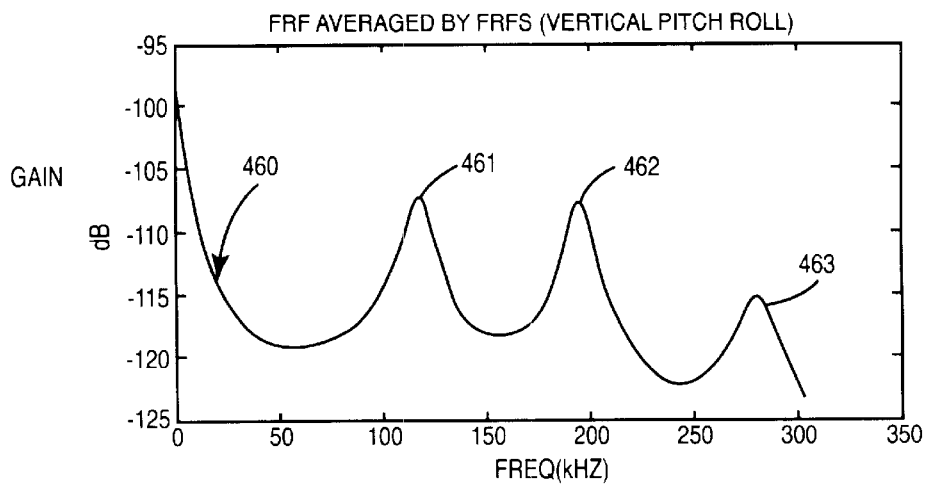
FIG. 9D is a graph illustrating vibration frequency response of the slider shown in FIG. 8.
Figure 9E:
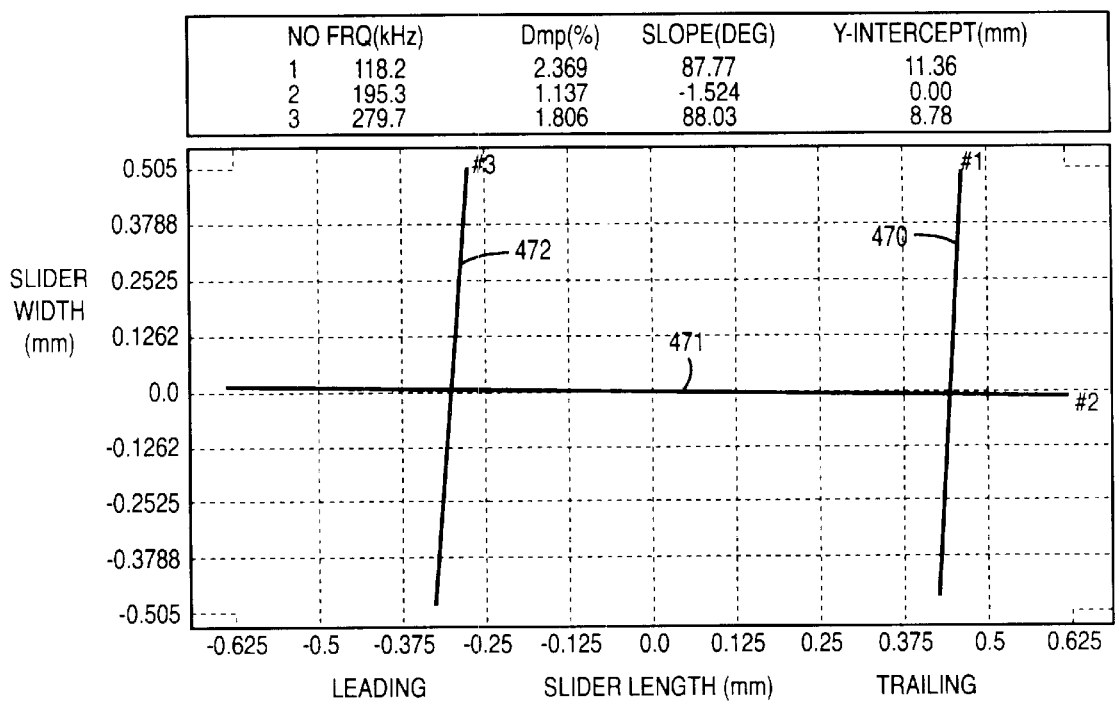
FIG. 9E is a graph illustrating vibration nodal lines of the slider shown in FIG. 8.

FIG. 8 is a bottom plan view of a slider 450 having a similar bearing geometry as slider 110, but with no convergent channel features. Also slider 450 does not have side rails with recessed waist surfaces similar to surfaces 222 shown in FIG. 5. FIGS. 9A–9C are graphs showing the flying height, pitch and roll impulse responses, respectively, of slider 450, similar to FIGS. 7A–7C. As compared to the impulse responses shown in FIGS. 7A–7C, the impulse responses of slider 450 take quite a long time to stabilize. In FIG. 9D, line 460 represents the averaged flying height, pitch and roll frequency responses of slider 450, which has clear resonant peaks 461, 462 and 463 for leading edge pitch mode, roll mode and trailing edge pitch mode vibrations, respectively. FIG. 9E shows the vibration nodal lines for slider 450 as a function of position on the slider surface similar to FIG. 7E. Line 470 represents the trailing edge pitch mode nodal line, line 471 represents the roll mode nodal line, and line 472 represents the leading edge pitch mode nodal line for slider 450. Looking at FIGS. 9A–9E, slider 450 has relatively low 2.4%, 1.1% and 1.8% damping ratios for leading edge pitch mode, roll mode and trailing edge pitch mode vibrations.

Figure 10:
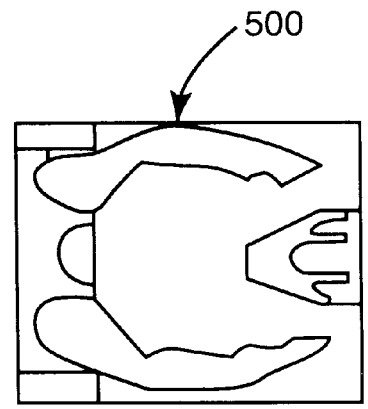
FIG. 10 is a bottom, perspective view of a slider, which has a convergent channel feature on the center rail.
Figure 11A:
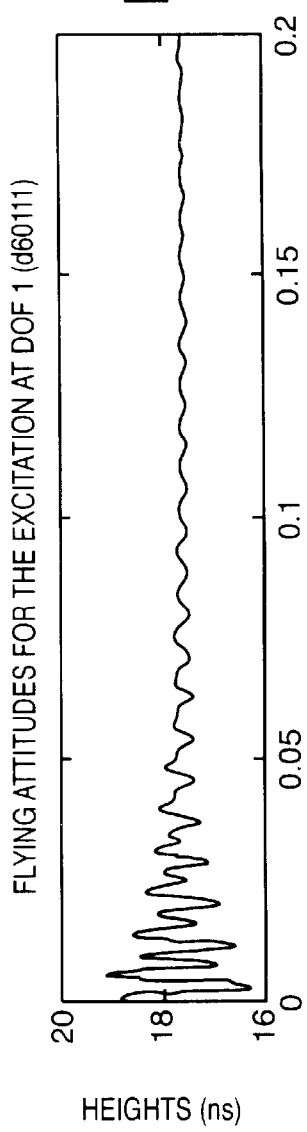
FIGS. 11A, 11B and 11C are graphs showing simulated flying height, pitch and roll impulse vibration responses of the slider shown in FIG. 10.
Figure 11B:
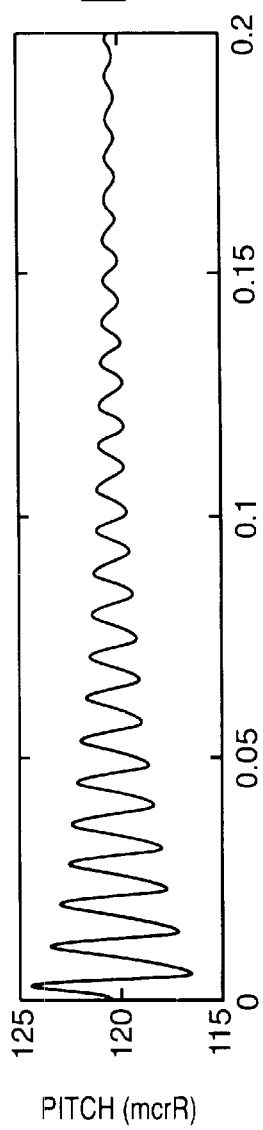
Figure 11C:
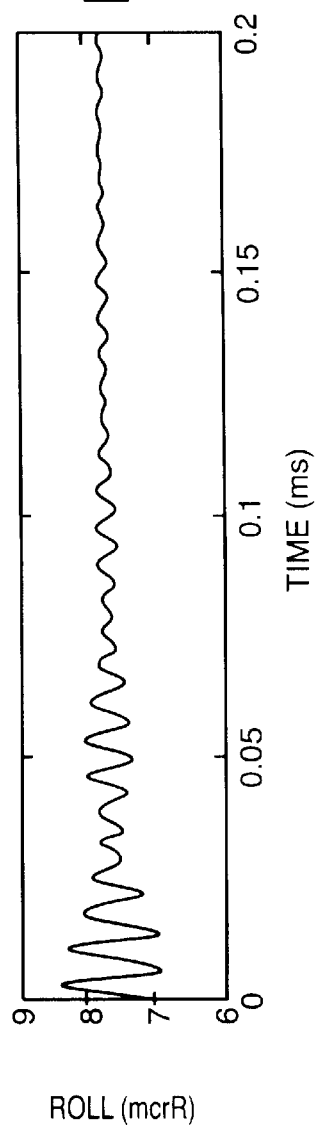
Figure 11D:
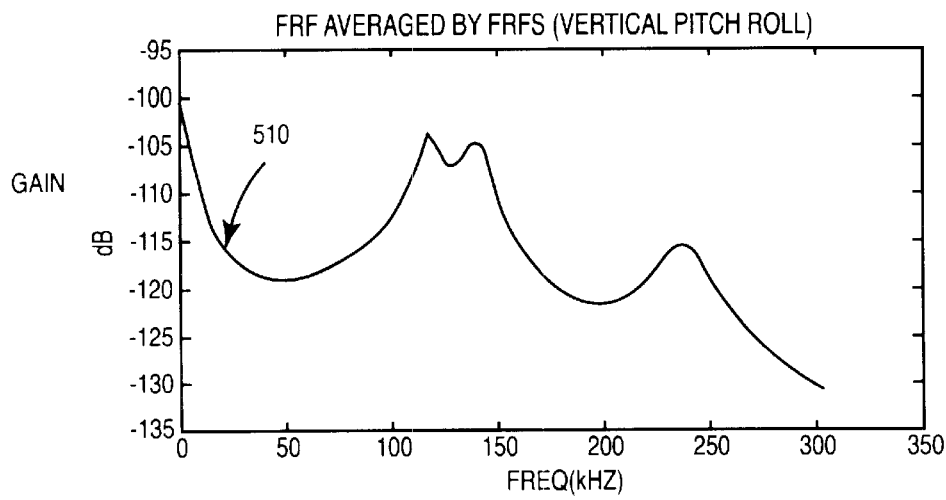
FIG. 11D is a graph illustrating vibration frequency response of the slider shown in FIG. 10.
Figure 11E:
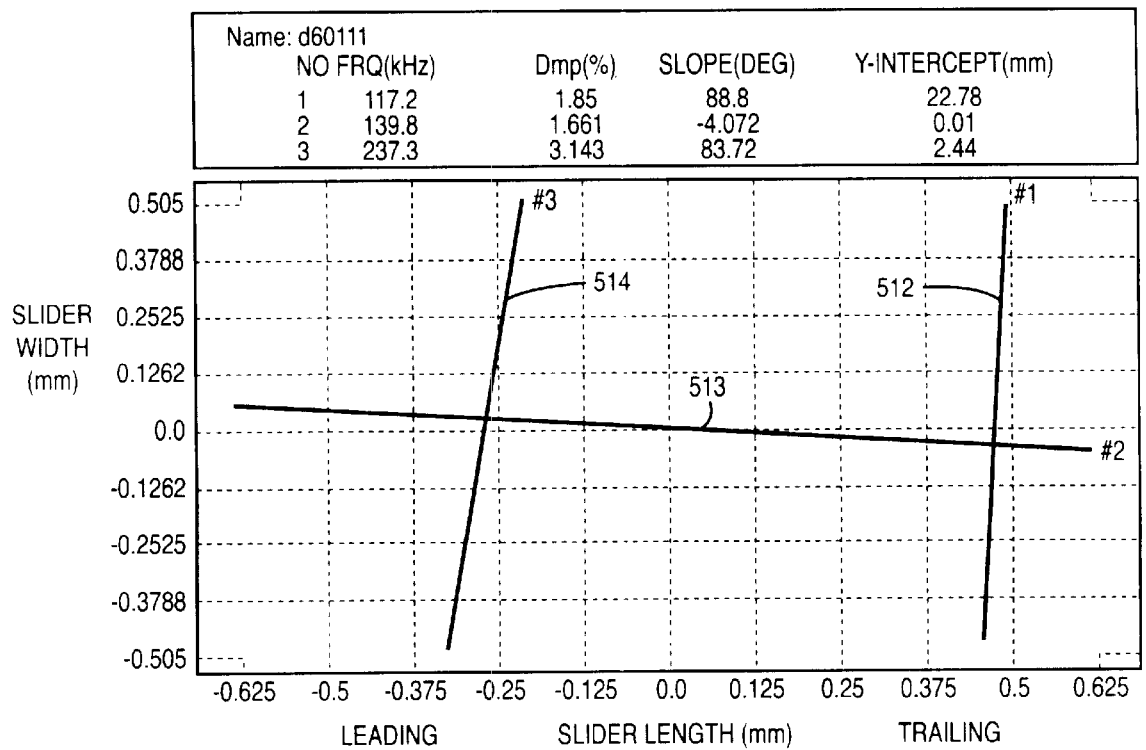
FIG. 11E is a graph illustrating vibration nodal lines of the slider shown in FIG. 10.

FIG. 10 is a bottom plan view of a slider 500 having two convergent channel features recessed in the center rail bearing surface, near the slider's trailing edge. FIGS. 11A–11C are graphs illustrating the flying height, pitch and roll impulse responses, respectively, for slider 500. FIG. 11D is a graph having a line 510, which illustrates the averaged flying height, pitch and roll frequency responses of slider 500. Line 510 has less clearly defined resonant frequencies as compared to line 460 in FIG. 9D. FIG. 11E is a graph illustrating the vibration nodal lines for slider 500 as a function of position on the slider surface. Slider 500 has a trailing edge pitch mode nodal line 512, a roll mode nodal line 513 and a leading edge pitch mode nodal line 514. As can be seen from FIGS. 11A–11E, slider 500 has relatively low 1.8%, 1.7% and 3.1% damping ratios for leading edge pitch, roll and trailing edge pitch mode vibrations, respectively. However, the trailing edge pitch mode damping ratio is increased with respect to the 1.8% damping ration of slider 450 shown in FIG. 8.

Figure 12:
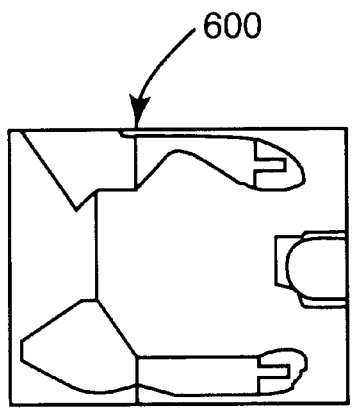
FIG. 12 is a bottom, perspective view of a slider, which has convergent channel features and recessed waist surfaces on the side rails only.
Figure 13A:
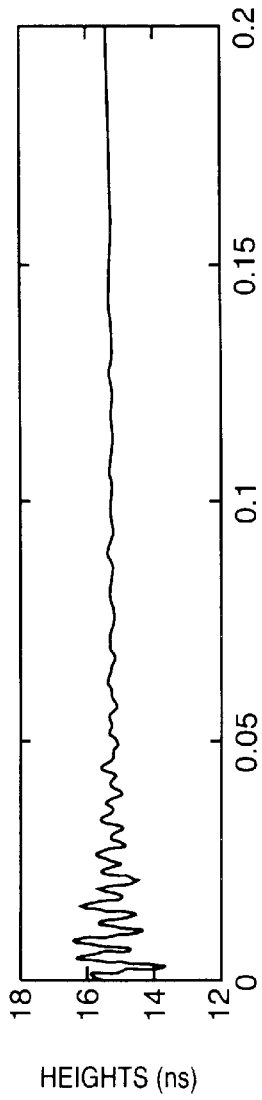
FIGS. 13A, 13B and 13C are graphs showing simulated flying height, pitch and roll impulse vibration responses of the slider shown in FIG. 12.
Figure 13B:
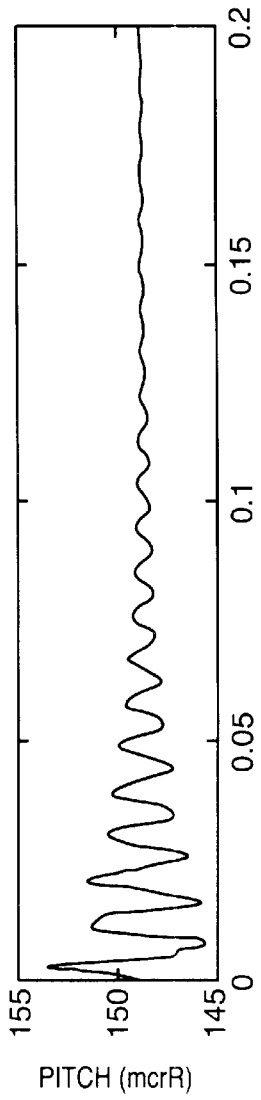
Figure 13C:
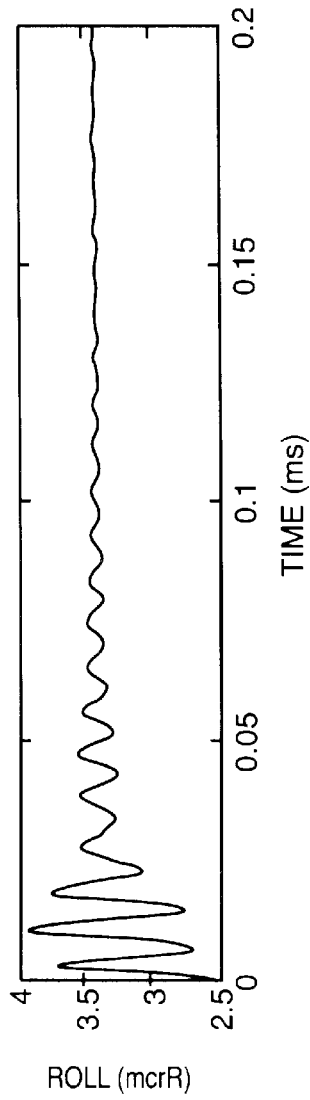
Figure 13D:
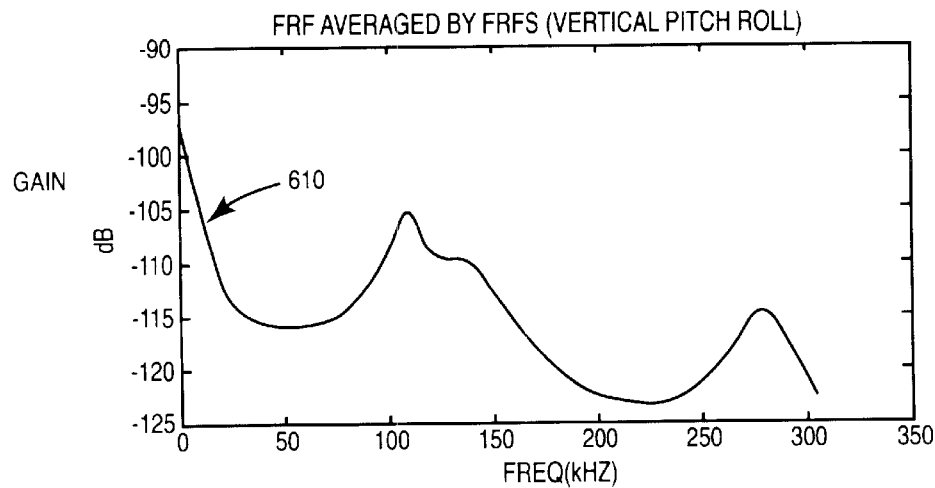
FIG. 13D is a graph illustrating vibration frequency response of the slider shown in FIG. 12.
Figure 13E:
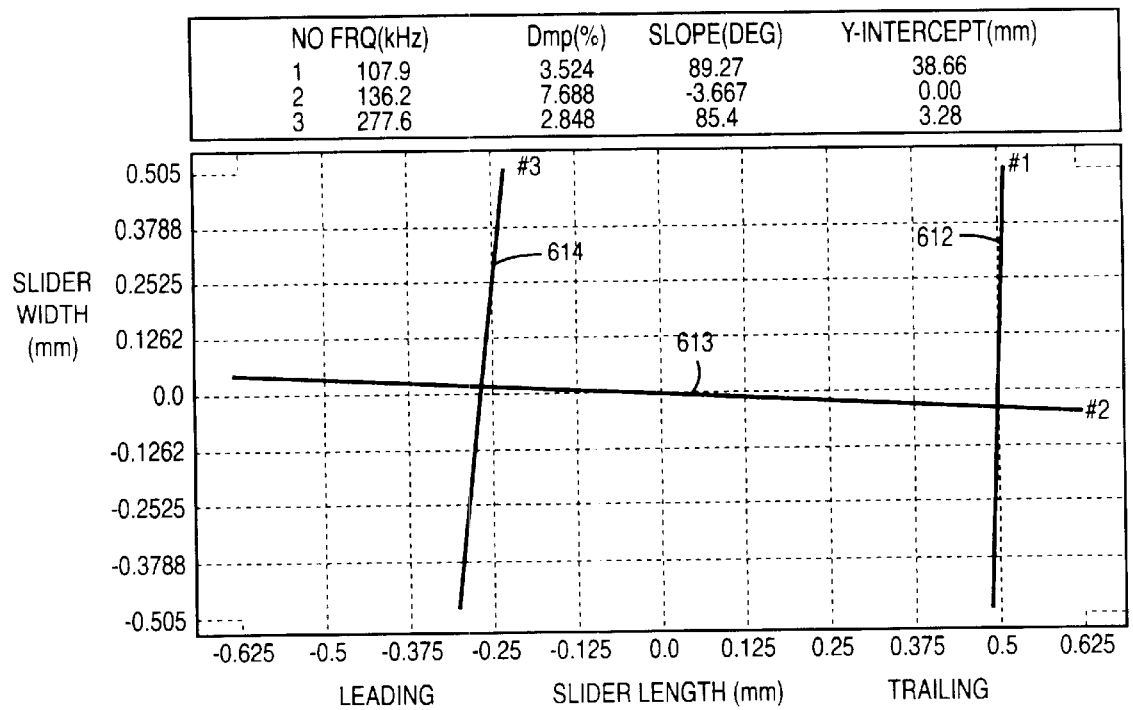
FIG. 13E is a graph illustrating vibration nodal lines of the slider shown in FIG. 12.

FIG. 12 is a bottom plan view of a slider 600 having convergent channel features on the trailing bearing surfaces of the side rails, as opposed to the center rail as in FIG. 10. Also, slider 600 has side rails with recessed waist portions for pressurizing the convergent channel features. FIGS. 13A–13C are graphs illustrating the flying height, pitch and roll impulse responses, respectively, for slider 600. FIG. 13D is a graph illustrating the frequency response of slider 600. Similar to FIGS. 7D and 9D, line 610 represents the averaged flying height, pitch and roll frequency responses of slider 600. Line 610 has less a clearly defined roll resonant frequency as compared to line 460 in FIG. 9D. FIG. 13E is a graph illustrating the vibration nodal lines for slider 600 as a function of position on the slider surface. Slider 600 has a trailing edge pitch mode nodal line 612, a roll mode nodal line 613 and a leading edge pitch mode nodal line 614. As can be seen from FIGS. 13A–13E, slider 600 has relatively low 3.5%, 7.7% and 2.8% damping ratios for leading edge pitch, roll and trailing edge pitch mode vibrations, respectively. However, the roll mode damping ratio is significantly increased with respect to that of slider 450 shown in FIG. 8 and slider 500 shown in FIG. 10.

Figure 14:
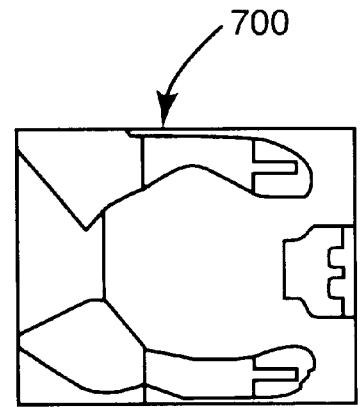
FIG. 14 is a bottom, perspective view of a slider, which has convergent channel features and recessed waist surfaces on the side rails and the center rail.
Figure 15D:
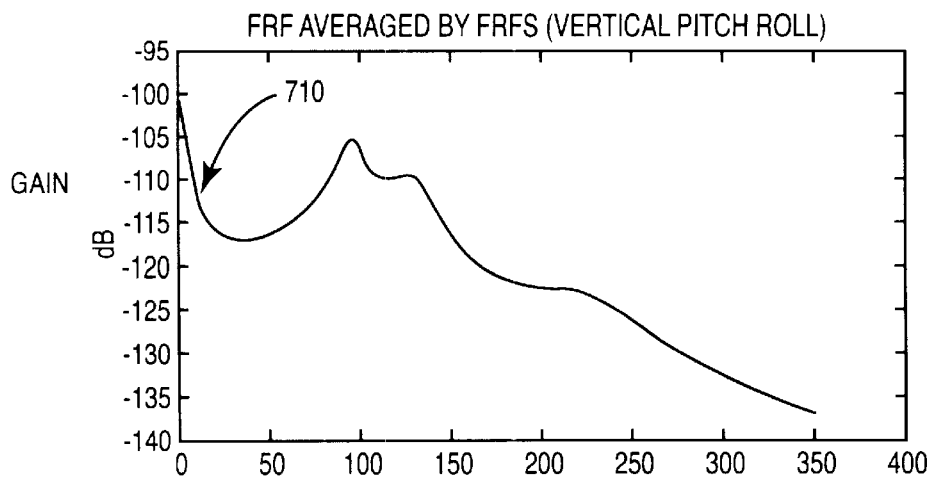
FIG. 15D is a graph illustrating vibration frequency response of the slider shown in FIG. 14.
Figure 15E:
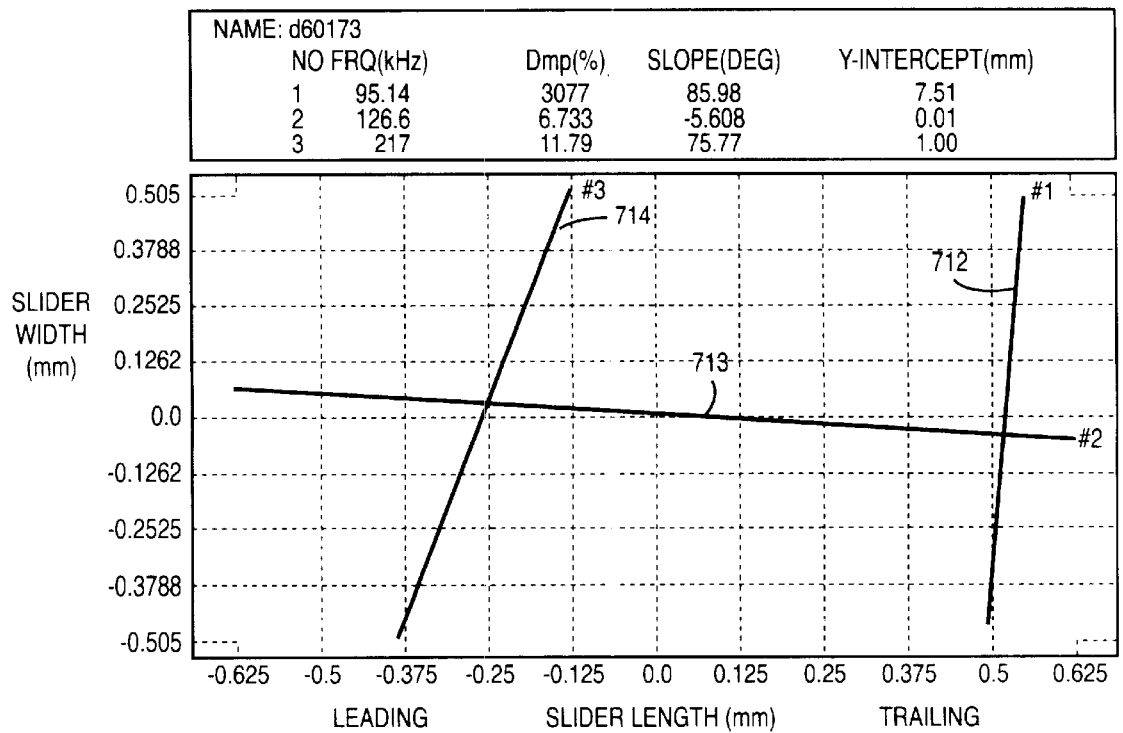
FIG. 15E is a graph illustrating vibration nodal lines of the slider shown in FIG. 14.

FIG. 14 is a bottom plan view of a slider 700 having one convergent channel feature recessed in the center rail bearing surface and two convergent channel features recessed in the trailing bearing surfaces of the side rails. FIGS. 15A–15C are graphs illustrating the flying height, pitch and roll impulse responses, respectively, for slider 700. FIG. 15D is a graph illustrating the frequency response of slider 700. Similar to FIGS. 7D, 9D, 11D and 13D, line 710 represents the averaged flying height, pitch and roll frequency responses of slider 700. Line 710 has less clearly defined trailing edge pitch and roll mode resonant frequencies as compared to line 460 in FIG. 9D. FIG. 15E is a graph illustrating the vibration nodal lines for slider 700 as a function of position on the slider surface. Slider 700 has a trailing edge pitch mode nodal line 712, a roll mode nodal line 713 and a leading edge pitch mode nodal line 714. As can be seen from FIGS. 15A–15E, slider 700 has relatively 3.1%, 6.7% and 11.8% damping ratios for leading edge pitch, roll and trailing edge pitch mode vibrations, respectively. The combination of convergent channels in the center rail and the trailing ends of the side rails provides improved damping of trailing edge pitch mode and roll mode vibrations.

The simulation results for sliders 110, 450, 500, 600 and 700 are gathered in Table 1 below, which provides the natural vibration frequency and damping ratio for each slider with respect to leading edge pitch, roll and trailing edge pitch mode vibrations.

TABLE 1

|  | SLIDER 450 | | SLIDER 500 | | SLIDER 600 | | SLIDER 700 | | SLIDER 110 | |
| --- | --- | --- | --- | --- | --- | --- | --- | --- | --- | --- |
|  | kHz | Damping % | kHz | Damping % | kHz | Damping % | kHz | Damp. ing % | kHz | Damping % |
| Mode 1 (LE Pitch) | 118 | 2.4 | 117 | 1.8 | 108 | 3.5 | 95 | 3.1 | 86 | 7.2 |
| Mode 2 (Roll) | 195 | 1.1 | 140 | 1.7 | 136 | 7.7 | 127 | 6.7 | 117 | 7.1 |
| Mode 3 (TE Pitch) | 279 | 1.8 | 237 | 3.1 | 278 | 2.8 | 217 | 11.8 | 207 | 12.6 |

Comparing the simulation results of sliders 600 and 700 with the simulation results of sliders 450 and 500, Table 1 shows that the addition of recessed waist surfaces and convergent channel features in the side rails provide enhanced roll mode damping ratios from about 1% to about 7% due to the transverse viscous sheer flow across the recessed waist surfaces and the high-pressure gradients developed within the channels. Comparing slider 450 with slider 500, Table 1 shows that the addition of convergent channel features on the center rail at the slider's trailing edge increasing damping of trailing edge pitch mode vibrations from 1.8% to 3.1% due to the high pressure gradient produced at the slider's trailing edge. This is particularly true for slider 700 in which the trailing edge pitch damping ratio is increased to 11.8%. This suggests that the convergent channel features and the recessed waist areas on the side rails enhance roll mode damping, while the convergent channel features on the center rail at the slider's trailing edge enhance trailing edge pitch mode damping. Finally, comparing sliders 110 with slider 700, Table 1 shows that the addition of leading convergent channel features on the side rails of slider 110 increases leading edge pitch mode damping to 7.2%.

The convergent channel features provided on slider 110 therefore allow enhanced damping and minimization of air bearing vibration provoked by excitation sources, such as media micro-waviness, wear debris on the media, shock waves and intermittent contact with the media. Vibration damping capability is increasingly critical for head-media separation modulation control for sliders having flying heights at or below 0.5 uin and for sliders having intermittent contact with the disc surface, such as sliders having with ultra-low flying heights or quasi-contact conditions. Greater control of head-media separation modulation therefore preserves mechanical and magnetic read/write quality of the head-disc interface.

Figure 16:
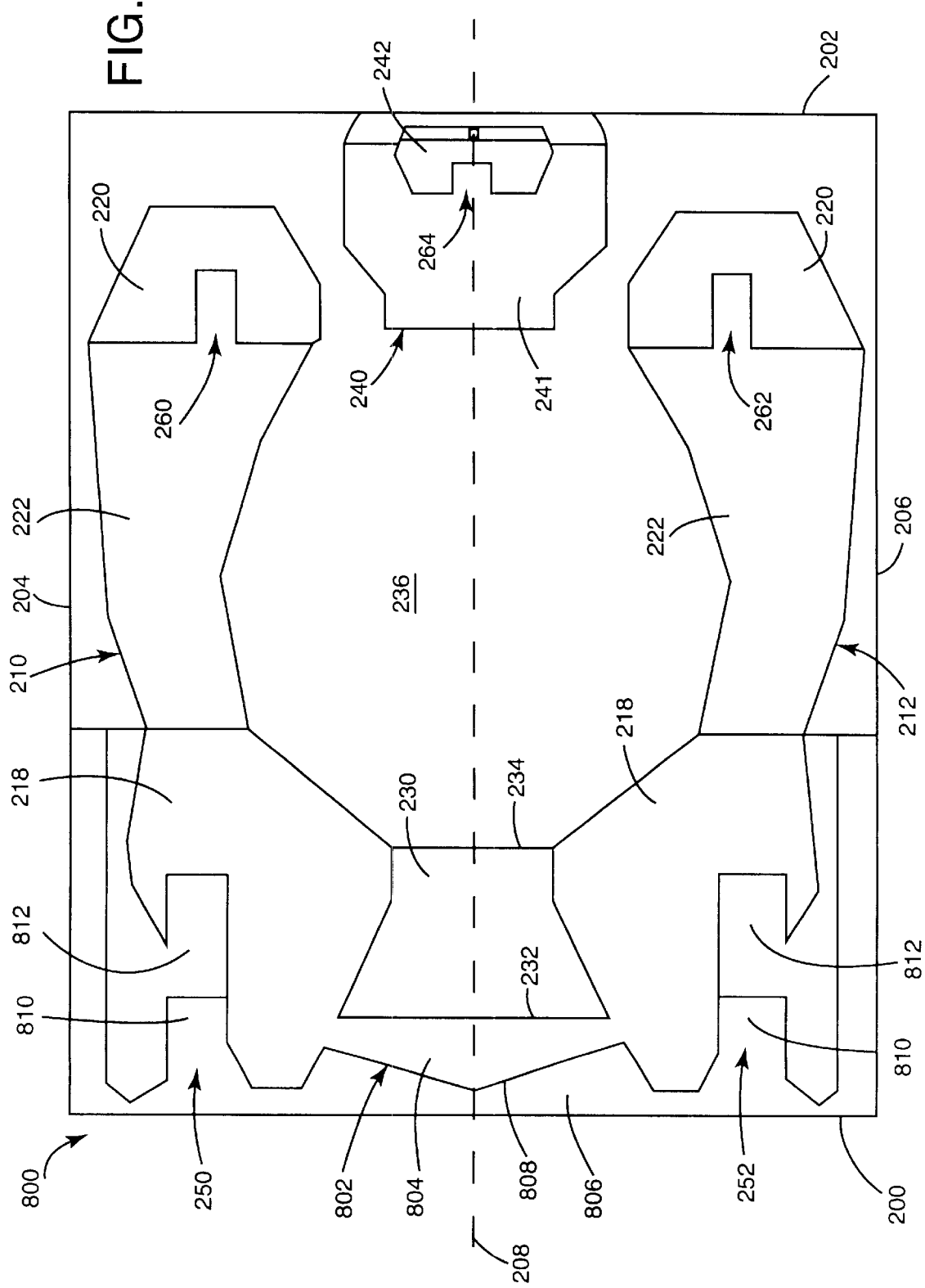
FIG. 16 is a bottom plan view of a slider according to an alternative embodiment of the present invention.

FIG. 16 is a bottom plan view of a slider 800 according to an alternative embodiment of the present invention. Slider 800 is similar to slider 110 shown in FIG. 5, and the same reference numerals are used in FIG. 16 as were used in FIG. 5 for the same or similar elements. Slider 800 further includes a raised, leading wall 802, which extends laterally between leading bearing surfaces 218 of side rails 210 and 212, along slider leading edge 200. Leading wall 802 is positioned between slider leading edge 200 and the leading edge 232 of cavity dam 230. Leading wall 802 has a top surface 804, which is coplanar with leading bearing surfaces 218 and is raised from surface 806 the "step depth" of cavity dam 230 (e.g. 0.1 to 0.3 micrometers) plus the "cavity depth" (e.g. 1 to 3 micrometers) of subambient pressure cavity 236. Leading wall 802 has a wall surface 808, which faces leading slider edge 200. Wall surface 808 has no upstream taper or shallow step to assist in pressurizing wall top surface 804 to create an inlet effect. As a result, wall surface 808 re-directs a portion of the fluid flow from leading slider edge 200 toward leading channels 250 and 252. Once the fluid flow enters leading channels 250 and 252, the flow is essentially bounded by the channel side walls and trailing channel end and is forced to rise over the trailing channel end. This creates a "convergent" channel for the flow, which results in high pressure gradients along discrete regions of bearing surfaces 218, as described above.

In the embodiment shown in FIG. 16, wall surface 808 is angled slightly such that the wall surface diverges from leading slider edge 200 as the surface extends from axis 208 toward slider side edges 204 and 206. Other wall geometries can also be used. Also, leading wall 802 can extend the entire distance between leading bearing surfaces 218 or can extend only part way between leading bearing surfaces 218.

Another difference between slider 800 and slider 110 shown in FIG. 5 is that leading channels 250 and 252 of slider 800 have channel floors with two levels. Channels 250 and 252 have a first, upstream section 810 which has a depth equal to the depth of leading surface 806. Channels 250 and 252 also have a second, down stream section 812 which has a depth equal to the step depth of about 0.1 to 0.3 microinches, for example.

Figure 17:
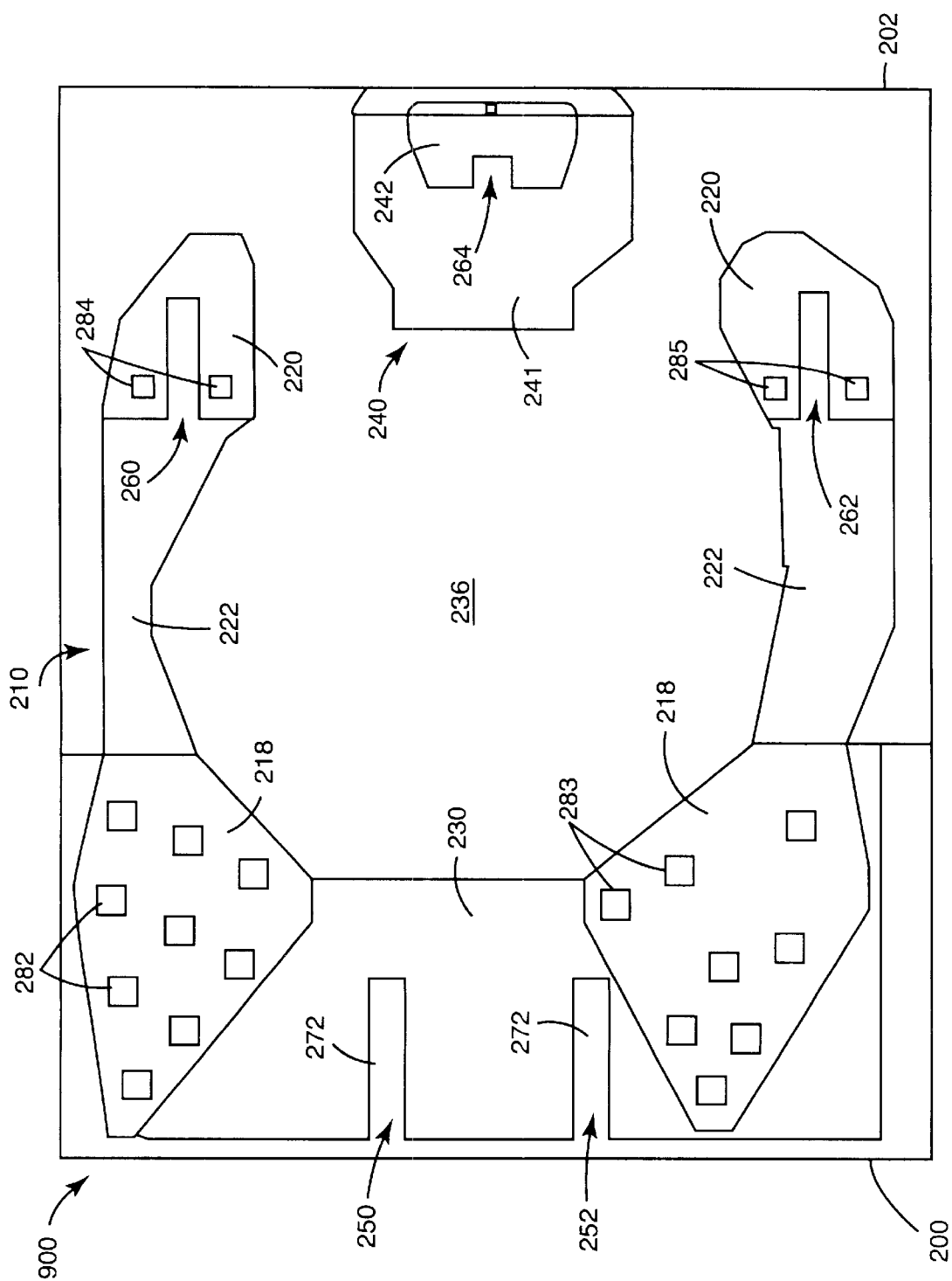
FIG. 17 is a bottom plan view of a slider according to another alternative embodiment of the present invention.

FIG. 17 is a bottom plan view of a slider 900 according to another alternative embodiment of the present invention. Again, the same reference numerals are used in FIG. 17 as were used in FIG. 5 for the same or similar elements. In this embodiment, leading channels 250 and 252 are formed in cavity dam 230 as opposed to leading bearing surfaces 218 of side rails 210 and 212. This alternative position of leading channels 250 and 252 can be used in applications in which there is not enough room in leading bearing surfaces 218 to form the channels. Similar to the embodiment of FIG. 5, channels 250 and 252 have depths measured from bearing surfaces 218, which are equal to the step depth of 0.1 to 0.3 micrometers plus the cavity depth of 1 to 3 microinches. Leading channels 250 can be positioned anywhere along leading slider edge 200.

Other air bearing geometries can also be used. For example, center rail 240 can extend all the way to cavity dam 230, with leading step surface 241 having an elongated rectangular section which leads to the trailing edge of cavity dam 230. In addition, this elongated center rail can have a leading bearing surface, which is formed on cavity dam 230. Other variations can also be made.

Although the present invention has been described with reference to preferred embodiments, workers skilled in the art will recognize that changes may be made in form and detail without departing from the spirit and scope of the invention. For example, the present invention can be used on sliders having various bearing geometries, such as negative pressure air bearing (NPAB) sliders and positive pressure air bearing (PPAB) sliders. Also, the slider of the present invention can be used with various types of transducers, such as magnetic heads, magneto-resistive heads, and optical heads.

What is claimed is:

1. A disc head slider comprising:
   a leading slider edge;
   a cavity dam;
   a subambient pressure cavity, which trails the cavity dam and has a cavity floor;
   first and second rails disposed about the subambient pressure cavity, wherein each rail comprises a rail width measured from an inner rail edge to an outer rail edge, a leading bearing surface, a trailing bearing surface, and a recessed surface extending between the leading and trailing bearing surfaces, which is recessed from the bearing surfaces and raised from the cavity floor, across the rail width;
   first and second recessed, leading channels positioned near the leading slider edge, wherein each leading channel comprises a leading channel end open to fluid flow from the leading slider edge, channel side walls, and a trailing channel end closed to the fluid flow from the leading slider edge; and
   a trailing channel recessed within each of the trailing bearing surfaces, wherein each trailing channel comprises a leading channel end open to fluid flow from the respective recessed surface, non-divergent channel side walls, and a trailing channel end closed to the fluid flow from the respective recessed surface.

2. The disc head slider of claim 1 wherein each of the leading and trailing channels comprises:
   a channel width, which is measured between the channel side walls;
   a channel length, which is measured between the leading and trailing channel ends and is at least twice the channel width; and
   wherein the trailing channel end of each trailing channel is positioned forward of a localized pressure gradient region of the respective bearing surface, and the localized region has a length that is at least as long as the channel width.

3. The disc head slider of claim 1 wherein the first and second leading channels are recessed within the leading bearing surfaces of the first and second rails, respectively, and extend forward from the leading bearing surfaces to the leading slider edge.

4. The disc head slider of claim 3 wherein:
   the leading and trailing channels each comprise a channel floor, which has a depth measured from the leading and trailing bearing surfaces; and
   the depth of the leading channels is greater than the depth of the trailing channels.

5. The disc head slider of claim 4 wherein:
   the depth of the leading channels is greater than a depth of the cavity floor, as measured from the leading and trailing bearing surfaces.

6. The disc head slider of claim 4 wherein:
   the channel floors of the trailing channels are coplanar and contiguous with the respective recessed surfaces of the first and second rails.

7. The disc head slider of claim 6 wherein the channel floors of the trailing channels, the recessed surfaces and the cavity dam are recessed from the leading and trailing bearing surfaces by 0.1 to 0.5 microns, and the subambient pressure cavity is recessed from the leading and trailing bearing surfaces by 1 to 3 microns.

8. The disc head slider of claim 1 wherein the first and second leading channels are recessed within the cavity dam.

9. The disc head slider of claim 1 and further comprising:
   a leading slider edge;
   a trailing slider edge;
   a raised center rail positioned between the first and second rails, at the trailing slider edge, wherein the center rail comprises a center rail bearing surface and a further channel, which is recessed within the center rail bearing surface and comprises a leading channel end open to fluid flow from the subambient pressure cavity, non-divergent channel side walls and a trailing channel end closed to the fluid flow and forward of a localized pressure gradient region of the center rail bearing surface; and
   wherein the first and second rails-terminate prior to the trailing slider edge.

10. The disc head slider of claim 1 and further comprising:
    a raised leading wall, which faces the leading slider edge and extends between the leading bearing surfaces of the first and second rails, forward of the cavity dam, wherein the raised leading wall has a height that is at least as great as a depth of the subambient pressure cavity, as measured from the leading and trailing bearing surfaces, and the leading channels are recessed in the leading bearing surfaces of the first and second rails, respectively.

11. A disc head slider comprising:
    a leading slider edge and a trailing slider edge;
    first and second laterally spaced leading bearing surfaces;
    first and second laterally spaced trailing bearing surfaces positioned between the first and second leading bearing surfaces and the trailing slider edge; and
    a respective convergent channel recessed within each of the leading and trailing bearing surfaces and comprising a leading channel end open to fluid flow traveling in a direction from the leading slider edge toward the trailing slider edge, channel side walls, a trailing channel end closed to the fluid flow and positioned forward of a localized pressure gradient region on the respective bearing surface, a channel width, which is measured between the channel side walls, and a channel length, which is measured between the leading and trailing channel ends and is at least twice the channel width, wherein the localized region has a length, which is at least as long as the channel width.

12. The disc head slider of claim 11 wherein the channels in the leading bearing surfaces extend forward from the leading bearing surfaces to the leading slider edge.

13. The disc head slider of claim 11 wherein:
    the channels each comprise a channel floor, which has a depth measured from the leading and trailing bearing surfaces; and the depth of the channels in the leading bearing surfaces is greater than the depth of the channels in the trailing bearing surfaces.

14. The disc head slider of claim 13 and further comprising:
   a cavity dam positioned between the leading bearing surfaces; and
   a subambient pressure cavity, which trails the cavity dam with respect to the leading slider edge and has a depth that is less than the depth of the channels in the leading bearing surfaces, as measured from the leading and trailing bearing surfaces.

15. The disc head slider of claim 13 and further comprising:
   a cavity dam positioned between the leading bearing surfaces; and
   a subambient pressure cavity, which trails the cavity dam with respect to the leading slider edge;
   first and second slider side edges;
   a first raised side rail positioned along the first slider side edge, wherein the first leading bearing surface and the first trailing bearing surface are formed on the first raised side rail and are separated by a waist section of the first raised rail, which is recessed from the bearing surfaces and raised from the cavity;
   a second raised side rail positioned along the second slider side edge, wherein the second leading bearing surface and the second trailing bearing surface are formed on the first raised side rail and are separated by a waist section of the second raised rail, which is recessed from the bearing surfaces and raised from the cavity; and
   wherein the channel floors of the channels in the trailing bearing surfaces are coplanar and contiguous with the respective recessed waist sections of the first and second rails.

16. The disc head slider of claim 15 wherein the channel floors of the channels in the trailing bearing surfaces, the recessed waist sections and the cavity dam are recessed from the leading and trailing bearing surfaces by 0.1 to 0.5 microns, and the subambient pressure cavity is recessed from the leading and trailing bearing surfaces by 1 to 3 microns.

17. The disc head slider of claim 11 and further comprising:
   a raised center pad positioned between the first and second trailing bearing surfaces, at the trailing slider edge, wherein the center pad comprises a center pad bearing surface and a further channel, which is recessed within the center pad bearing surface and comprises a leading channel end open to the fluid flow, channel side walls and a trailing channel end closed to the fluid flow and forward of a localized pressure gradient region of the center bearing surface; and
   wherein the first and second trailing bearing surfaces terminate prior to the trailing slider edge.

18. The disc head slider of claim 11 and further comprising:
   a raised leading wall, which faces the leading slider edge and extends between the first and second leading bearing surfaces, wherein the raised leading wall has a height that is at least as great as 1.0 micrometers.

19. A disc drive assembly comprising:
   a disc rotatable about a central axis and having a recording surface with a circumferential waviness characteristic; and
   slider bearing means for supporting a transducer over the recording surface at a flying height of 0.5 microinches or less during rotation of the disc and for generating vibration dampening positive pressure gradients, as measured along the slider bearing means in a direction at which the disc rotates, of at least 20 Giga-Pascals per meter between the bearing surface and the disc, at multiple locations along the bearing surface.

* * * * *